United States Patent
Majd et al.

(10) Patent No.: US 6,587,974 B1
(45) Date of Patent: Jul. 1, 2003

(54) METHOD FOR FAULT DETECTION AND FAST PROTECTION SWITCHING IN TRANSMISSION SYSTEMS

(75) Inventors: Casem Majd, Eatontown, NJ (US); Morten Nissov, Holmdel, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/443,358

(22) Filed: Nov. 19, 1999

(51) Int. Cl.$^7$ .................................................. H04L 1/22
(52) U.S. Cl. ........................................ 714/56; 370/253
(58) Field of Search ............................... 714/56, 51, 48, 714/47, 43, 37, 25; 370/252, 253, 241, 242; 710/20, 36

(56) References Cited

U.S. PATENT DOCUMENTS

| | | | |
|---|---|---|---|
| 3,652,798 A | * 3/1972 | McNeilly et al. | 179/15 AL |
| 4,543,574 A | * 9/1985 | Takagi et al. | 340/825.5 |
| 4,878,049 A | * 10/1989 | Ochiai et al. | 371/5.5 |
| 5,317,569 A | * 5/1994 | Ralph et al. | 370/85.9 |
| 5,371,789 A | * 12/1994 | Hirano | 379/410 |
| 5,506,956 A | * 4/1996 | Cohen | 395/182.04 |
| 5,541,759 A | * 7/1996 | Neff et al. | 359/152 |
| 5,566,161 A | * 10/1996 | Hartmann et al. | 370/15 |
| 5,731,887 A | * 3/1998 | Fee | 359/110 |
| 5,757,526 A | * 5/1998 | Shiragaki et al. | 359/110 |
| 5,777,761 A | * 7/1998 | Fee | 359/110 |
| 5,914,794 A | 6/1999 | Fee et al. | 359/110 |
| 6,331,905 B1 | * 12/2001 | Ellinas et al. | 359/110 |

OTHER PUBLICATIONS

AT&T Technical Journal: "Undersea Communications Technology" Jan./Feb. 1995, vol. 74, No. 1, pp. 1–102.

* cited by examiner

Primary Examiner—Nadeem Iqbal

(57) ABSTRACT

The present invention provides a method of detecting and correcting a fault in a signal transmission system. The method for detecting and correcting signal transmission faults in a signal transmission system includes bi-directional signaling on the same fiber, cable or signal line. A fault in a transmitted signal from a first upstream node to a second downstream node is determined by the loss or degradation of a signal simultaneously transmitted from the second downstream node to the first upstream node transmitted in the opposite on the same cable, signal line, or optical fiber. As a result, the aggregate propagation delay of the transmitted signals necessary for fault detection and fault notification is reduced and the amount of time to detect a fault and restore fault free signal transmission between one node and another node in a signal transmission systems is reduced, thereby increasing user satisfaction with minimal signal transmission interruptions even in the case of a transmission line fault. Further, a transmission line fault may be detected prior to transmission of a desired signal so that an alternate traffic route may be predetermined before transmission of the desired signal.

26 Claims, 4 Drawing Sheets

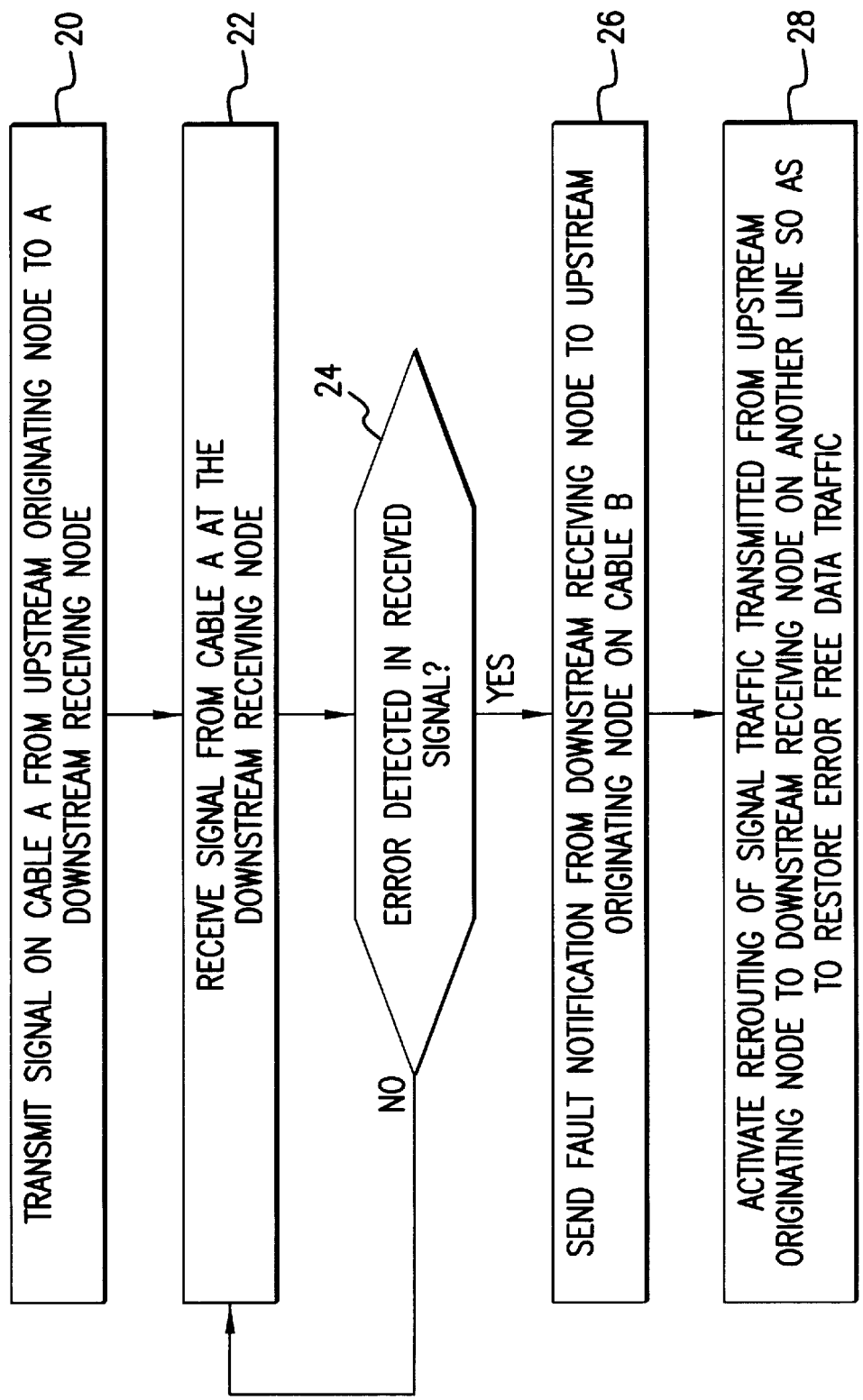

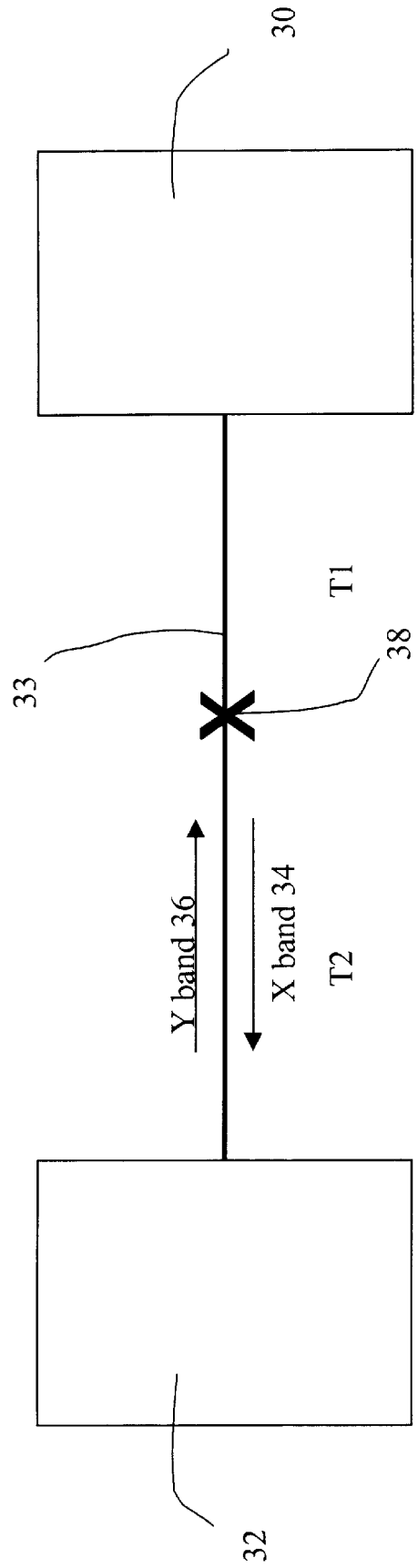

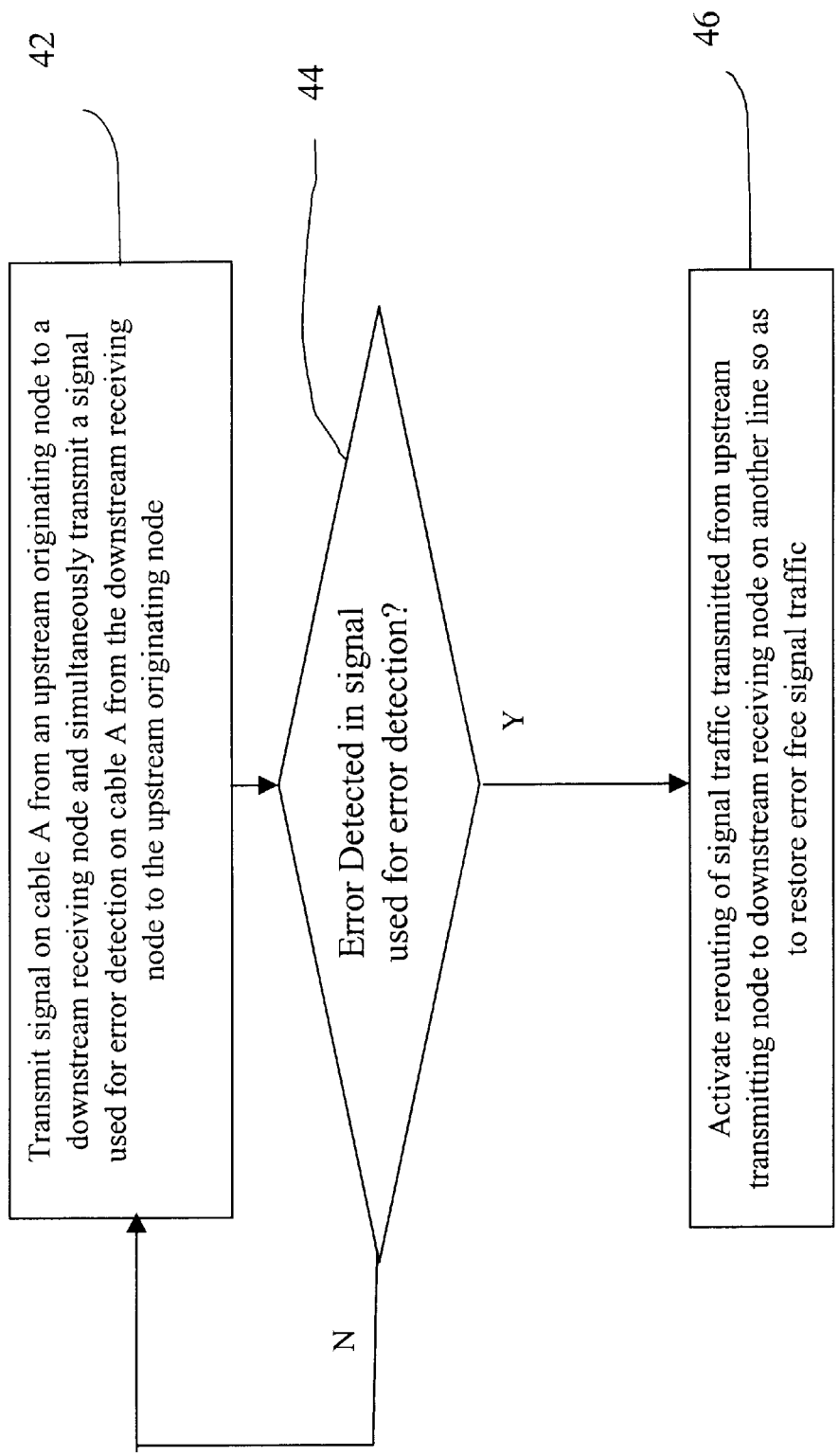

METHOD FOR FAULT DETECTION AND FAST PROTECTION SWITCHING IN TRANSMISSION SYSTEMS

BACKGROUND OF THE INVENTION

1. Technical Field of the Invention

The present invention relates generally to signal transmission systems constructed of physical cables, and more particularly to a method for protection switching in case of detecting faults in such signal transmission systems.

2. Description of the Related Art

Signal faults in signal transmission systems that use a physical cable for signal transmission include reduced signal strength that results in signal degradation and complete loss of signal (e.g., break in the cable). In digital transmissions systems requiring high reliability, rapid signal fault detection is often used to enable the traffic to be re-routed so that there is little discernible loss of signal to the user when a fault occurs. In a conventional signal transmission system using signal transmission cables, one method of signal fault detection is to monitor and detect a signal fault at a receiving end of a first transmission signal cable and if a fault is detected a fault notification message is sent back to the originating (transmitting) end via a different (e.g., second) cable so that any fault in the first transmission cable will not keep the fault notification message from arriving at the originating end. Once a fault notification message is received by the originating end via the second cable, the signal transmission system re-routes the signal traffic from the cable on which a fault has been detected to another transmission cable. This type of fault detection protocol is in many circumstances slow to provide the desired level of user indiscernible signal reception when a fault occurs along a cable transmission signal path.

For example, the greater the length of the transmission path the longer time it will take a signal to propagate from one point to another on the transmission path, and thus the longer the time delay between the time when a signal fault occurs and the time when the signal is re-routed and recovered. This delay is of particular concern in, for example, transoceanic and transcontinental transmission because of the great lengths a signal (both the original signal and error notification message signals) must travel before it reaches its destination. The longer this distance and related signal propagation delay, the more likely that an end user will sense that the transmission has been dropped when a fault occurs in a transoceanic or transcontinental transmission cable path (e.g., a degradation or break in the transmission signal). A specific example of this conventional fault detection and restoration method is provided below.

FIG. 1 illustrates one signal transmission system that would use the fault detection method described above. In this example, the signal transmission system may be a telephone communication system having a first node 10 which includes a transmitter connected to cable 13. The transmitter in node 10 sends voice signal transmission on cable 13 to node 12, node 12 having a receiver. In this case, node 10 may be referred to as the originating or upstream cable station and node 12 may be referred to as the receiving or downstream cable station. The voice signals in this case may be transmitted on either of two frequency bands, X and Y bands 14 which accommodate a respective signal and operate in a unidirectional manner from node 10 to node 12. If cable 13 is a fiber optic cable (single fiber line) that includes double band Erbium doped fiber amplifier (EDFA), then the X band may be for example a conventional amplification band (C band) which has a typical range of amplification wavelength band between 1525 nm to about 1570 nm, and the Y band may be for example a long wavelength amplification band (L band) which has a typical range of amplification wavelength band between 1560 nm to about 1610 nm. The signal transmission system also includes a second cable 15 over which voice and/or data signals may be transmitted from node 12 to node 10. Cable 15 may likewise be a fiber optic cable that includes dual band EDFAs with X and Y bands 16. The X 18 on cable 13 illustrates the location of a signal fault, for example an unacceptable signal degradation or a break in a signal being transmitted from node 10 to node 12.

The conventional method for fault detection in the transmission system of FIG. 1 will now be explained with reference to FIG. 1 and the process flow diagram of FIG. 2. First, at step 20 a signal (e.g., voice or data signal) is transmitted on a first cable A, cable 13, from the upstream originating node, node 10, to a downstream receiving node, node 12. This signal may travel on either X band, Y band, or both X and Y bands 14. Next in step 22, the signal is received at the downstream receiving node 12. At step 24, the receiver of node 12 connected to cable 13 monitors the incoming signal for a fault. If a fault is not detected in the received signal at node 12, the receiver continues to monitor the received signal at step 22. However, if an error is detected at step 24, for example a break occurs at X 18 (see FIG. 1), a transmitter of node 12 (downstream node) connected to a second cable, cable B (cable 15), sends a fault notification message on the second cable B (15) to a receiver of the upstream originating node 10. Finally, at step 28, the transmission system activates re-routing of the data signal traffic transmitted from the upstream originating node 10 to the downstream receiving node 12 on another cable (or fiber) so as to restore error free data traffic from node 10 to node 12.

Using the conventional error detection method, the time it takes the transmission system to restore error free signals includes (1) signal propagation delay time, (2) failure detection time, (3) hold-off time, (4) switching time, and (5) frame synchronization time. The signal propagation delay time includes a first propagation delay time T2 along cable 13 from X 18 to node 12, which represents the time it takes for a lost or degraded signal that occurs at fault X 18 to reach node 12, and a propagation delay time T3 from node 12 to node 10, which represents the propagation time it takes the error notification to travel from node 12 to node 10. These time delays can be considerable in transoceanic and transcontinental signal transmission where the cable lengths can span thousands of miles or kilometers. This translates into typical propagation delays (T2+T3) on the order of, for example, 50–100 milliseconds (ms) for a fiber optic transoceanic cable which may be too long in some systems and leads to total delays on the order of 300 ms from the time an error occurs until an error free signal is restored, such as a telephone voice signal transmission. This restoration time can result in providing a system user unacceptable service, for example, if a fault occurs along a long length telephone signal cable the cumulative signal recovery time my result in the telephone user concluding that the telephone call has been dropped. Therefore, there is a need for a fault detection method in signal transmission systems which reduces the delay associated with protection switching protocol and reduces the time span between the time a fault occurs and the time the transmission system restores error free signal transmission from one node to another node.

SUMMARY OF THE INVENTION

The present invention provides a method of detecting the loss or degradation of a transmitted signal in a signal transmission system. The method for detecting and correcting signal transmission faults in a signal transmission system includes bi-directional signaling on the same fiber, cable, or signal line. A fault in a transmitted signal from a first upstream node to a second downstream node is determined by the loss or degradation of a signal simultaneously transmitted from the second downstream node to the first upstream node transmitted in the opposite direction on the same fiber, cable, signal line. As a result, the propagation delay of the transmitted signals necessary for protection switching protocol and fault protection, and the amount of time to restore fault free signal transmission between one node and another node in a signal transmission systems is reduced, thereby increasing user satisfaction with minimal signal transmission interruption in the case of a transmission fault.

In one feature of a preferred embodiment of the present invention, the method uses bi-directional signals on a single optical fiber connected between an originating upstream cable station and a receiving downstream cable station. A first voice, data or video signal is transmitted from the originating upstream cable station to the receiving downstream cable station using a first signal wavelength while simultaneously a second signal is transmitted from the receiving downstream cable station to the upstream originating cable station using a second signal wavelength complementary to the first voice or data signal. If a fault occurs on the optical fiber between the two cable stations the fault is detected by the upstream cable station as a result of monitoring the second signal sent by the downstream cable station. The only propagation delay in detecting the fault is the time it takes the second signal to propagate from the location of the fault to the upstream originating cable station. If a degradation or break in the second signal occurs, the upstream originating cable station determines that the first voice or data signal it originally sent to the downstream cable station is experiencing the same fault and thus re-routes the signal so as to be received error free by the downstream cable station.

In another feature of the present invention, a transmission line fault is detected prior to transmission of a desired signal. In this alternative, a signal used for fault detection is transmitted from the downstream node to an upstream node before the desired transmission signal is sent from the upstream node to the downstream node. Thus, the transmission line may be checked for faults prior to transmitting the desired transmission signal. If a fault is detected on the transmission line prior to beginning transmission of the desired signal, an alternative traffic route may be predetermined before transmission of the desired signal on the faulty transmission line so that the transmission of the desired signal begins on a fault free transmission line.

BRIEF DESCRIPTION OF THE DRAWINGS

FIG. 2 is a process flow diagram for a conventional fault detection and correction method useful in the signal transmission system of FIG. 1.

FIG. 3 is a block diagram of a preferred embodiment of a transmission system according to the present invention.

FIG. 4 is a process flow diagram for a preferred embodiment of the present invention fault detection and correction method.

DESCRIPTION OF THE PREFERRED EMBODIMENTS

Figure 1:
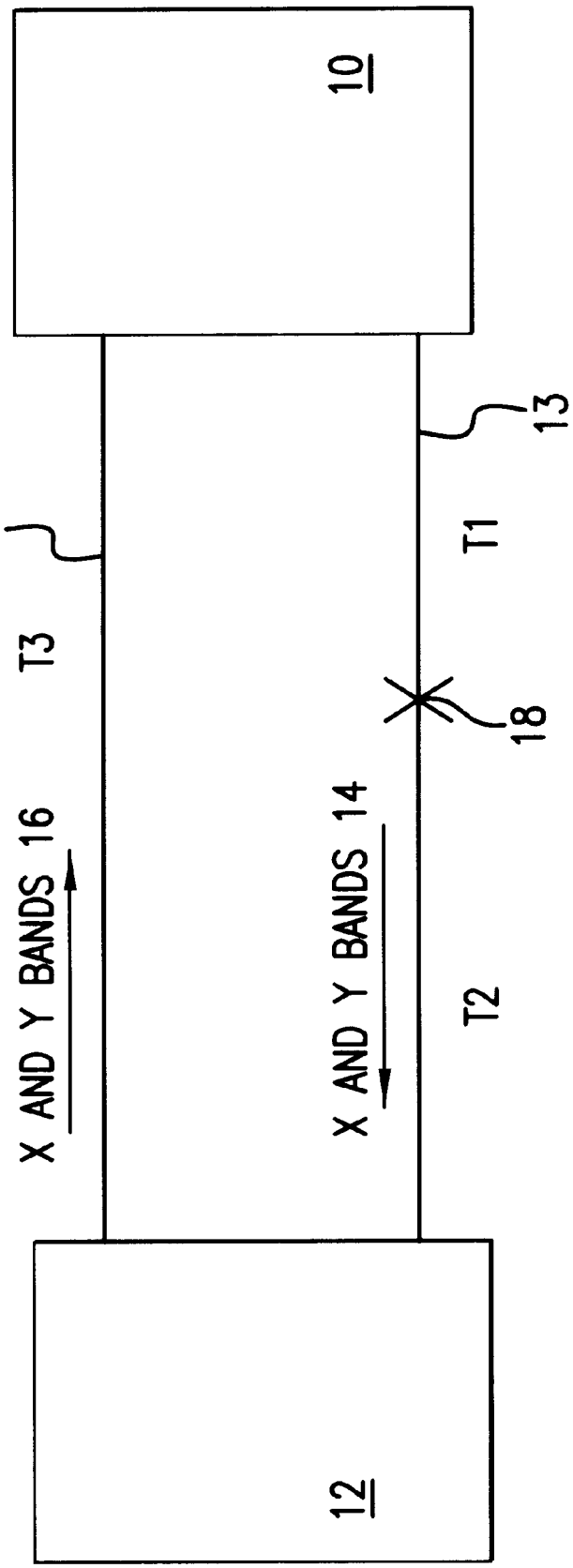
FIG. 1 is a block diagram of a conventional transmission system including fault detection.

The present invention provides a method of detecting the loss or degradation of a transmitted signal in a signal transmission system. This method will be described using preferred embodiments involving a communications transmission system having for example optical fiber transmission lines. However, one skilled in the art would understand the invention to be applicable generally to many types of signal transmission systems, including power transmission systems and telecommunication systems having coaxial cable transmission lines.

The present invention for detecting and correcting signal transmission faults in a signal transmission system uses the concept of bi-directional signaling on the same cable or signal line, for example, a single optical fiber transmission line. This single optical transmission line may include one or more electro-optical repeaters or optical amplifiers (e.g., EDFAs) and may be part of an all-optical signal transmission system or a hybrid fiber coaxial cable signal transmission system. The present invention will detect a fault in any part of the transmission system and correct it. For example, the fault detection method of the present invention can detect a break in the transmission cable or a faulty repeater or amplifier along the transmission cable and re-route the traffic to be fault free.

In general, the present invention operates so that a fault in a transmitted signal from a first upstream node to a second downstream node is determined by the loss or degradation of a different signal simultaneously transmitted from the second downstream node to the first upstream node transmitted in the opposite direction on the same cable, signal line, or optical fiber. As a result, the signal propagation delay necessary for fault detection is the amount of time it takes the second signal to propagate from the position of the fault to the upstream originating node and the time to detect a fault and restore fault free signal transmission between one node and another node in a signal transmission systems may be reduced. Reduced fault detection and restoration time increases user satisfaction, particularly in applications such as transoceanic or transcontinental telephone voice or video signal transmission.

Referring now to FIGS. 3 and 4, preferred embodiments of the present invention will be described. First, the fault detection and correction method of the present invention uses bi-directional transmission signals, X band 34 and Y band 36, on a single cable or optical fiber 33 (cable A) connected between an originating upstream node, cable station 30, and a receiving downstream node, cable station 32. A first voice or data signal is transmitted from the originating upstream cable station 30 to the receiving downstream cable station 32 using a first signal wavelength, for example the C band, while a second signal is transmitted from the receiving downstream cable station 32 to the upstream originating cable station 30 using a second signal wavelength complementary to the first voice or data signal, for example the L band. If a fault occurs on the optical fiber 33 between the two cable stations, 30 and 32, the fault is detected by the upstream cable station 30 as a result of monitoring the second signal on the Y band 36 (e.g., L band) sent by the downstream cable station 32. As a result, the only propagation delay in detecting a signal transmission fault using the present method is the time it takes the second signal on Y band 36 to propagate from the location of the fault, X 38, to the upstream originating cable station 30.

The method for fault detection and restoration of the present invention is simplified and quicker than the conventional methods because there is no need for the downstream cable station 32 to detect a signal transmission error and then send an error notification message to the originating upstream cable station after an error is detected. As illustrated in FIG. 4, in the first step 42, a voice or data signal is transmitted on cable A, for example optical fiber 33, from the upstream originating node 30 to a downstream data receiving node 32 while a second signal is transmitted on the same cable, optical fiber 33, from the downstream data receiving node 32 to the upstream originating node 30. In step 44, the upstream originating node 30 determines whether there is an error detected in the second signal, e.g., used for error detection, received by the upstream originating node 30. If there is no error in the second signal then the upstream originating node 30 continues to monitor the incoming second signal from cable 33 for errors. However, if an error is detected on the second signal, the signal transmission system at step 46 activates re-routing of the voice or data signal transmitted from the upstream transmitting (originating) node 30 to the downstream receiving node 32 on another cable and/or optical fiber line, using conventional methods well known in the art, to restore error free data traffic. Thus, if a degradation or break in the second signal occurs, the upstream originating cable station 30 determines that the first voice or data signal it originally sent to the downstream cable station 32 is experiencing the same fault and thus re-routes the signal so that error free signals are received by the downstream cable station 32.

As illustrated in FIG. 3, the signal propagation delay experience for the present invention is the time T1 which it takes the second signal on the Y band 36 (e.g., e.g., the L band or the C band for an optical fiber) to travel from the error location X 38 to the upstream originating cable station 30. This signal propagation delay will always be less than the total signal propagation delay, T2+T3, experienced in the conventional fault detection and restoration method (see FIG. 1).

Further, as previously eluded to, the method of detecting a transmission signal failure of the present will detect and correct any type of failure in signal transmission along the cable 33, including breaks in the transmission line or reduced amplification in repeaters or EDFA along the transmission line. In the case of a fiber optic cable break there would be a break and the signal would stop altogether. On the other hand, a repeater or amplifier failure would result in an identifiable reduction in the amplitude of the transmitted signal. In either case, the present invention would detect and correct the signal transmission failure with only a propagation delay T1, rather than the longer delay of T2+T3. The protocol which may be used in the fiber optic transmission system for detecting a failure is carried in the header of a voice or data signal being sent to the upstream originating cable station 30.

In another alternative preferred embodiment of the present invention, a transmission line fault is detected prior to transmission of a desired signal. In this alternative, a signal used for fault detection is transmitted from the downstream node to an upstream node before the desired transmission signal is sent from the upstream node to the downstream node. Thus, the transmission line may be checked for faults prior to transmitting the desired transmission signal. If a fault is detected on the transmission line prior to beginning transmission of the desired signal, an alternative traffic route may be predetermined before transmission of the desired signal on the faulty transmission line so that the transmission of the desired signal begins on a fault free transmission line.

Although particular embodiment of the present invention has been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

For example, as previously indicated although the present invention is described in more detail relative to telephone and data communication signal transmission, the present invention is applicable to any type of signal transmission system in which detecting a transmission line fault is important. However, the present invention is particularly useful in signal transmission systems which have long transmission cables, such as transoceanic and transcontinental transmission systems.

What is claimed is:

1. A method of detecting and correcting a fault in a signal transmission system, comprising:
   transmitting a first signal in a first direction on a transmission line;
   transmitting a second signal in a direction opposite said first direction on said transmission line; and
   detecting an irregularity in said first signal by detecting and irregularity in said second signal transmitted on said transmission line.

2. The method as claimed in claim 1, further including the step of:
   re-routing said first signal so as to achieve an error free signal.

3. The method as claimed in claim 1, wherein said first signal is transmitted from a first node to a second node and said second signal is transmitted from said second node to said first node.

4. The method as claimed in claim 3, wherein said first node is an upstream cable station and said second node is a downstream cable station.

5. The method as claimed in claim 4, wherein said transmission line is selected from the group consisting of an optical fiber and a coaxial cable.

6. The method as claimed in claim 5, wherein said first signal is transmitted on a first wavelength and said second signal is transmitted on a second wavelength complementary to said first wavelength.

7. The method as claimed in claim 6, wherein said transmission line is a optical fiber and includes an erbium-doped fiber amplifier.

8. The method as claimed in claim 7, wherein said first wavelength is within a conventional band (C band) optical transmission band and said second wavelength is within a long wavelength band (L band) optical transmission band.

9. The method as claimed in claim 7, wherein said first wavelength is within a long wavelength band (L band) optical transmission band and said second wavelength is within a conventional band (C band) optical transmission band.

10. The method as claimed in claim 1, wherein a propagation delay portion of a time for detecting said irregularity in said first signal is equal to a propagation delay of detecting said irregularity in said second signal.

11. A method of detecting and correcting a fault in a signal transmission system, comprising:
    transmitting a first signal from a first node at a first end of a transmission line to a second node at a second end of said transmission line;

transmitting a second signal from said second node to said first node on said transmission line; and detecting said fault in said transmission system by detecting an error in said second signal at said first end of said transmission line.

12. The method as claimed in claim 11, further including the step of:

re-routing said transmission of said first signal from said first node to said second node so as to achieve an error free signal.

13. The method as claimed in claim 11, wherein said first node is an upstream cable station and said second node is a downstream cable station.

14. The method as claimed in claim 13, wherein said transmission line is selected from the group consisting of an optical fiber and a coaxial cable.

15. The method as claimed in claim 14, wherein said first signal is transmitted on first wavelength and said second signal is transmitted on a second wavelength complementary to said first wavelength.

16. The method as claimed in claim 15, wherein said transmission cable is an optical fiber and includes an erbium-doped fiber amplifier.

17. The method as claimed in claim 16, wherein said first wavelength is within a conventional band (C band) optical transmission band and said second wavelength is within a long wavelength band (L band) optical transmission band.

18. The method as claimed in claim 16, wherein said first wavelength is within a long wavelength band (L band) optical transmission band and said second wavelength is within a conventional band (C band) optical transmission band.

19. The method as claimed in claim 18, wherein said first signal includes a telephone voice signal.

20. The method as claimed in claim 11, wherein a propagation delay portion of a time for detecting said error of said first signal is equal to a propagation delay for a distance from a location of said fault to said first node.

21. A method of detecting and correcting a fault in a signal transmission system, comprising the steps of:

transmitting a first signal from a upstream originating cable station at a first location of an optical fiber to a downstream receiving cable station at a second location of said optical fiber, using a first frequency band, while simultaneously transmitting a second signal from said downstream receiving cable station to said upstream originating cable station on a same said optical fiber using a second frequency band; and detecting an error in said second signal so as to determine said optical fiber transmission line has a fault that will result in an error in said first signal transmitted from said upstream originating cable station to said downstream receiving cable station.

22. The method as claimed in claim 21, wherein said first signal includes a telephone voice signal.

23. The method as claimed in claim 22, wherein said signal transmission system is a transoceanic signal transmission system.

24. The method as claimed in claim 23, further including the step of:

re-routing said first signal so as to achieve an error free signal.

25. A method of detecting and correcting a fault in a signal transmission system, comprising the step of:

transmitting a first signal on a transmission line in a direction opposite that of a second signal, from a downstream node to an upstream node, so as to detect said fault in said transmission line.

26. A method of detecting and correcting a fault in a signal transmission system, comprising the step of:

transmitting a first signal on a transmission line in a direction opposite that of a second signal, from a downstream node to an upstream node, so as to detect said fault in said transmission line, wherein said step of transmitting a first signal on a transmission line in a direction opposite that of said second signal transmission occurs before said second signal transmission.

\* \* \* \* \*